US009010670B2

(12) United States Patent
Andre

(10) Patent No.: US 9,010,670 B2
(45) Date of Patent: Apr. 21, 2015

(54) METHOD AND MACHINE FOR MANUFACTURING PASTE, IN PARTICULAR CARBON PASTE FOR MAKING ALUMINUM PRODUCTION ELECTRODES

(75) Inventor: Jean-Francois Andre, Villette de Vienne (FR)

(73) Assignee: Fives Solios S.A., Saint Germain en Laye (FR)

(*) Notice: Subject to any disclaimer, the term of this patent is extended or adjusted under 35 U.S.C. 154(b) by 338 days.

(21) Appl. No.: 13/511,249

(22) PCT Filed: Nov. 25, 2009

(86) PCT No.: PCT/FR2009/052294
§ 371 (c)(1),
(2), (4) Date: May 22, 2012

(87) PCT Pub. No.: WO2011/064461
PCT Pub. Date: Jun. 3, 2011

(65) Prior Publication Data
US 2012/0228411 A1    Sep. 13, 2012

(51) Int. Cl.
*B02C 4/04* (2006.01)
*B02C 17/10* (2006.01)
*B01F 9/00* (2006.01)
*B01F 9/02* (2006.01)
*B01F 9/06* (2006.01)
*B01F 9/08* (2006.01)
(Continued)

(52) U.S. Cl.
CPC .............. *B01F 9/0007* (2013.01); *B01F 9/025* (2013.01); *B01F 9/06* (2013.01); *B01F 9/08* (2013.01); *B01F 13/105* (2013.01); *B01F 15/063* (2013.01); *B01F 2015/061* (2013.01); *B02C 15/06* (2013.01)

(58) Field of Classification Search
CPC ............ B02C 4/04; B02C 4/36; B02C 19/11; B02C 17/002; B02C 17/04; B02C 17/10
USPC ......................................................... 241/228
See application file for complete search history.

(56) References Cited

U.S. PATENT DOCUMENTS 2,698,144 A * 12/1954 Reiffen ........................ 241/206
2,726,068 A    12/1955 Howden
(Continued)

FOREIGN PATENT DOCUMENTS

CA    905 929 A    7/1972
DE    198 28 742 A1    12/1999
(Continued)

OTHER PUBLICATIONS

International Search Report, dated Jan. 11, 2011, from corresponding PCT application.

*Primary Examiner* — Mark Rosenbaum
(74) *Attorney, Agent, or Firm* — Young & Thompson

(57) ABSTRACT

Method and device for preparing a paste by blending or mixing materials, in particular for making aluminum production electrodes. The method includes the following operations: a) introducing the materials to be blended or mixed into a vat (31) having an inner surface extending along a substantially horizontal axis of revolution (X), b) rotating the vat (31) about the axis of revolution (X) and urging the materials via centrifugation against the inner surface of the vat (31), and c) locally dislodging the centrifuged materials from the inner surface by rotating the vat (31) and causing same to fall onto a crumbling tool (40).

11 Claims, 11 Drawing Sheets

(51) Int. Cl.
    *B01F 13/10*      (2006.01)
    *B01F 15/06*      (2006.01)
    *B02C 15/06*      (2006.01)

(56) References Cited

U.S. PATENT DOCUMENTS

| | | | |
|---|---|---|---|
| 3,102,717 | A | 9/1963 | Frenkel |
| 4,325,849 | A | 4/1982 | Rosen et al. |
| 5,205,494 | A | 4/1993 | Durinck et al. |
| 5,620,251 | A | 4/1997 | Funder et al. |
| 6,179,233 | B1 * | 1/2001 | Cordonnier et al. ............ 241/61 |
| 7,122,161 | B1 | 10/2006 | Moritz et al. |
| 2004/0206835 | A1 | 10/2004 | Hao |

FOREIGN PATENT DOCUMENTS

| | | |
|---|---|---|
| EP | 0 210 966 A2 | 2/1987 |
| EP | 0 486 371 A2 | 5/1992 |
| FR | 2 022 697 A1 | 8/1970 |
| FR | 2 742 078 A1 | 6/1997 |
| GB | 498 285 A | 1/1939 |
| GB | 713 822 A | 8/1954 |
| GB | 1 541 052 A | 2/1979 |
| GB | 2 018 650 A | 10/1979 |
| GB | 2 246 720 A | 2/1992 |
| JP | 2009 172493 A | 8/2009 |
| NL | 101 034 C | 3/1962 |
| SU | 307807 | 9/1971 |

* cited by examiner (STATE OF THE ART)

(STATE OF THE ART)

(STATE OF THE ART)

(STATE OF THE ART)

(STATE OF THE ART)

(STATE OF THE ART)

(STATE OF THE ART)

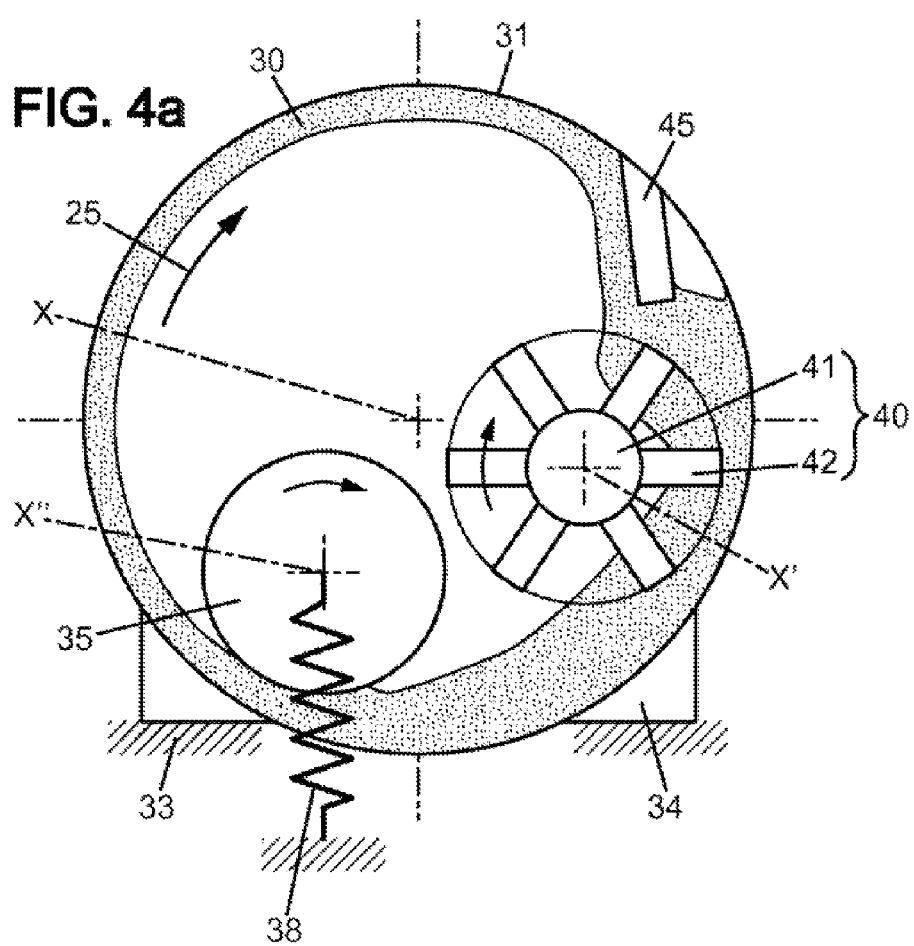

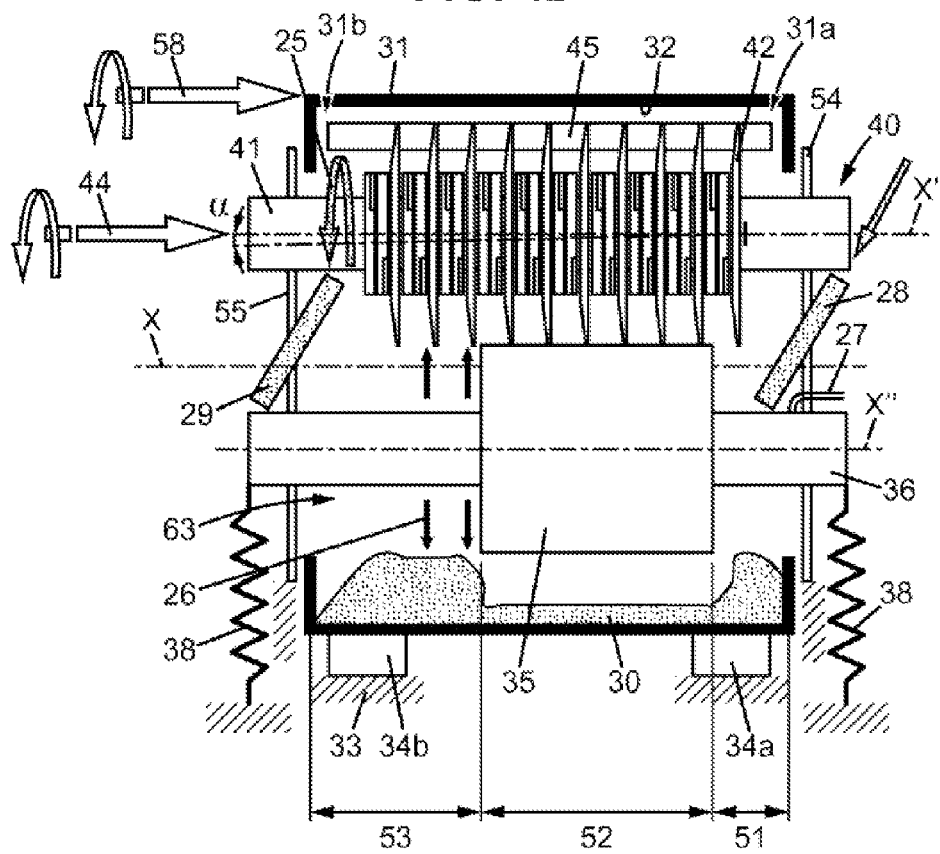

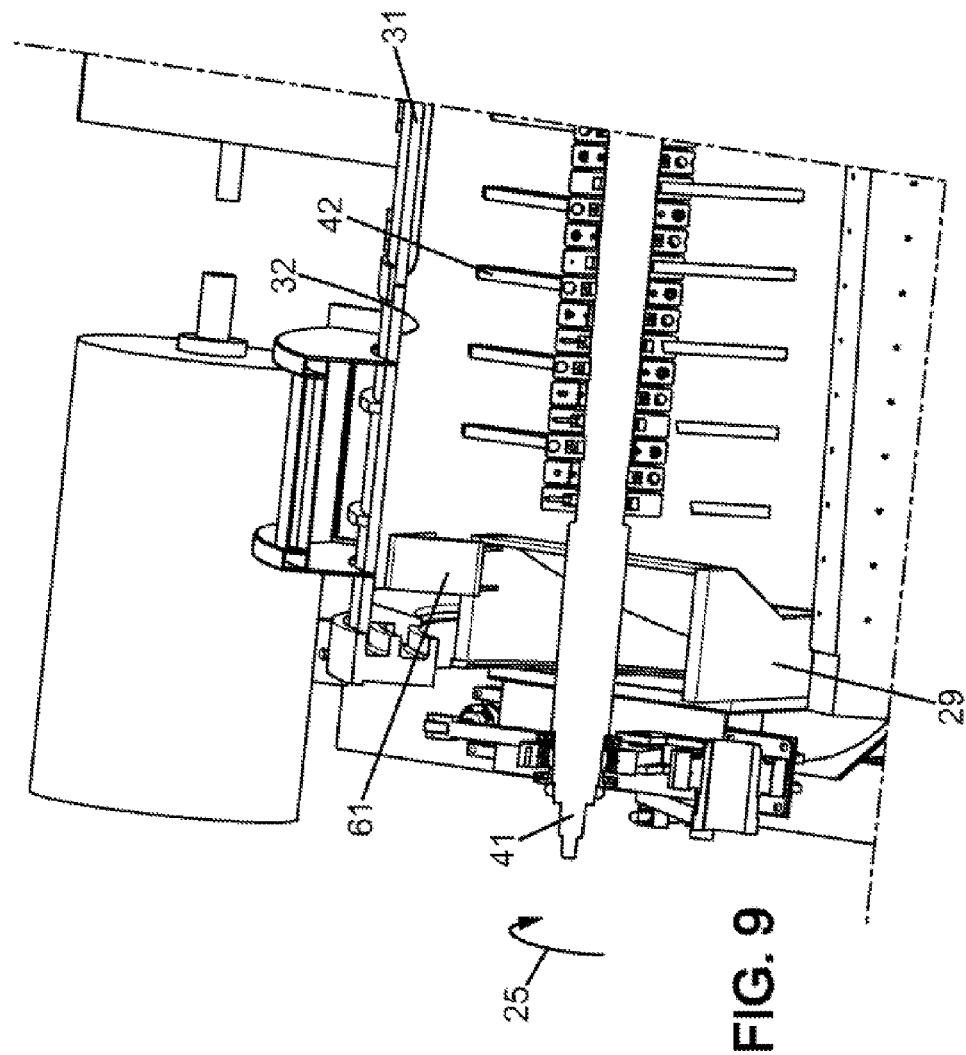

METHOD AND MACHINE FOR MANUFACTURING PASTE, IN PARTICULAR CARBON PASTE FOR MAKING ALUMINUM PRODUCTION ELECTRODES

FIELD OF THE INVENTION

The invention relates to a method and a machine for manufacturing paste, and in particular, because it is an application of the method and machine of the invention which seems to the applicant to be most advantageous, the invention relates to a method and a machine for manufacturing carbon paste for making aluminum production electrodes, by mixing and kneading, possibly followed by cooling, raw materials used to manufacture electrodes, and in particular anodes and cathodes for aluminum electrolysis, the materials that are included in the composition of the carbon paste being calcined coke, petroleum coke, and recycled anode or cathode scrap, as fillers, and liquid or solid coal-tar pitch as binder.

BACKGROUND OF THE INVENTION

There are several known mixing and kneading methods and devices commonly used for the manufacture of carbon paste.

One known device, historically the oldest but still in use today, consists primarily of a closed and substantially horizontal vat, with two rotating arms of a particular shape referred to as "Z arms" turning inside it in opposite directions, each respectively rotating around one of two axes that are substantially parallel and substantially in the same horizontal plane. This type of machine processes and prepares the paste in batches: each machine delivers a fixed quantity of prepared paste at fixed intervals, as opposed to a continuous processing and preparation method in which the paste is prepared at a constant rate.

FIGS. 1a and 1b respectively show a plan view with the vat open at the top, and an elevated side view with a vertical partial cross-sectional view, of an embodiment of such a machine. The vat (1) receives the paste components, pitch as binder, and the mixture of coke and recycled carbon-containing waste (also called "dry materials" to distinguish it from the pitch which is initially liquid or becomes so when hot). The vat (1) has a double wall with a heat transfer fluid circulating inside, at a temperature that is typically between 200 and 300° C. The coke and the recycled carbonaceous waste thus may, in a first mixing step of the method, be heated or maintained at their temperature if they are introduced hot into the vat (1). The pitch can be introduced in liquid form or in solid form. Two "Z arms" (2) rotate in opposite directions and often at different speeds, mixing and kneading or crushing the pitch and the dry materials. Each of the arms is driven by one of two respective gear motors (4) to rotate around its respective longitudinal axis XX or X'X'. When the mixing and kneading method is complete, a door (3) in the base of the vat (1) is opened to unload the prepared paste. The vat (1) and the two gear motors (4) are installed on a common frame (5). After the vat (1) is emptied, a new cycle can begin.

For example, in a typical machine of this first type, the vat (1) has a capacity of 5500 kg of paste, the mixing and kneading cycle lasts about an hour, and the nominal motor power is 190 kW. Such a machine weighs about 22000 kg and occupies a volume of 40 m$^3$. These characteristics show that this type of machine does not provide good performance: the output relative to the mass and the bulk of this machine is low, while the power involved is very high for the production results. In fact, mixing and kneading with "Z arms" (2) is inefficient. This low power is compensated for by longer mixing, at the expense of the output rate. In addition, the gear motors (4) have to have a high reserve capacity in order to handle all the various situations, because the machine does not have any means of regulating the cycle: the vat (1) is filled in a fixed manner and the paste temperature can only be modified very slowly. The actual average consumption is much lower than the nominal capabilities of the motors of the gear motors (4) used.

A machine of this type and the paste manufacturing method used by this machine, in which the paste components are mixed and kneaded under mechanical pressure (compressing the paste components in the vat), are described in patent document FR 2 022 697, which can be referred to for more information.

Today, the most commonly used device for manufacturing carbon paste by mixing and kneading its components, binder, and fillers as indicated above, is a horizontal worm mixer-kneader. An alternating axial displacement is superimposed on the rotational movement of the worm. This back and forth movement improves the mixing and kneading of the paste components. A known machine implementing this mixing and kneading method is represented in a schematic axial cross-sectional view in FIG. 2a, and in a larger-scale transverse cross-sectional view in FIG. 2b.

A worm (6) resting on two supports (7) and primarily consisting of a shaft with a helicoidal thread protruding outwards from the shaft is rotated by a control unit (8). The worm (6) is housed inside a cylindrical casing (9) equipped with an inlet (10) and an outlet (11). The raw materials, heated beforehand to the mixing temperature, typically 180° C., are introduced into the kneader-mixer at the inlet (10). The thread of the worm (6) is not continuous; it is interrupted for a portion of the circumference. FIG. 2b shows a typical arrangement where the thread consists of three identical sections (12), spaced at regular intervals 120° apart from each other per turn. Fixed teeth (13) are installed on the cylindrical casing (9) facing these defined open areas, projecting inwards from said casing towards the axis of rotation of the worm (6). FIGS. 2c and 2d are perspective drawings of the thread sections (12), spaced apart from each other around the rotational axis of the screw (6) by 120°, and protruding from the shaft (14) of the worm (6), FIG. 2c showing only an axial section of said shaft; the fixed tooth (13) with its foot for anchoring it in the cylindrical casing (9) providing a better view of the arrangement.

The continuous rotation of the worm (6) imparts a horizontal translational movement to the component materials of the paste, which draws them towards the outlet (11). Simultaneously, the worm (6) has a back-and-forth movement within the casing (9). This back-and-forth movement is synchronized with the continuous rotation of the worm (6) around its axis, so that the areas or sections (12) of the thread of the worm (6) can pass between the fixed teeth (13) of the casing (9) without interfering with these teeth. The continuous rotation, as well as the advancing component of the back-and-forth motion, therefore ensure that the materials advance from the inlet (10) to the outlet (11). This advance is hindered by the obstacles posed by the fixed teeth (13) of the casing (9), and by the backward movement of the worm (6). These combined axial and radial displacements efficiently crush the component materials of the paste while applying shear to the mixed materials, between the fixed teeth (13) and the threaded areas or sections (12) of the worm (6).

A machine of this type operates continuously. The component materials of the paste are introduced at a constant and controlled rate and exit at the same rate. At the outlet (11), two remote-controlled doors control the aperture size of the outlet from the mixer-kneader. It is thus possible to vary the degree to which the machine is filled, in order to maintain a constant level of power consumption. A commonly used machine of this type is capable of a paste output of 35 tons/hour, with a nominal power of 350 kW. By regulating the power, the yields are much better than those of the "Z arm" mixer-kneaders described above with reference to FIGS. 1a and 1b.

By their very design, the type of machine in FIGS. 2a and 2b contains little paste at any given moment, typically about a ton which is the average weight of the anodes produced. For this reason, these machines are often criticized for not homogenizing the paste sufficiently to eliminate variations in the quality of the raw materials used to form the paste.

A carbon paste manufacturing machine of this second type is described in patent document U.S. Pat. No. 4,652,226.

A third type of machine used in carbon paste manufacturing has recently been introduced for kneading the paste: a mixer-kneader with a tilted rotating drum, in which a mixing and kneading tool rotates similarly to a mill. The different components of such a machine are diagrammed in the attached FIG. 3.

A cylindrical drum (15), its axis tilted from the vertical, is rotated by a gear motor (16). A rotary tool (17) fitted with several paddles (18) is rotated around the tilted axis of the drum (15) by another gear motor (19). As it rotates, the drum (15) brings the materials (20) to the rotary tool (17) where the component materials of the paste are subjected to shear and dispersion to encourage mixing. A fixed scraper (21) dislodges the paste from the tilted side walls and from the bottom of the drum (15) so the paste falls vertically back into itself. There is a door (22) of variable size placed at the center of the drum (15), for discharging the prepared paste.

The machine provides a continuous flow during operation. The quality and quantity of the supply of materials to be mixed and kneaded is controlled. The amount of materials kept inside the drum (15) can be controlled by the door (22) opening. Of course, the power consumption varies with the level to which the drum is filled (15). It is therefore possible to regulate the power consumption in order to optimize the quality of the mixture and the yield from the machine. Similar results are also obtained by controlling the rotational speed of the rotary tool (17).

A typical machine, illustrated in FIG. 3, capable of a continuous paste output of 35 tons per hour holds 2500 kg of paste and has a nominal power of 200 kW. On average, the capacity of the machine corresponds to the production of two and a half anodes, which means a good level of homogenization.

A machine such as the one illustrated in FIG. 3 is commonly used to supplement other types of mixer-kneaders, for additional blending of the paste and in particular to cool it. It is best to do the kneading at a high temperature, typically between 180 and 200° C., where the pitch viscosity is lower in order to optimize pitch penetration into the coke particles and recycled carbonaceous waste. However, as the electrode production method applied downstream from the mixer-kneader requires paste at a lower temperature, a paste cooling step is required. Water is therefore introduced into the drum (15) at a controlled rate during the mixing process, to bring the paste to the desired temperature, typically from 140 to 160° C.

This machine, illustrated in FIG. 3 and commonly used as a cooler, only recently began to be installed as a primary mixing and kneading machine for the preparation of carbon paste, particularly anode paste.

From this brief presentation of the prior art, it can be seen that the preparation of carbon paste for aluminum production electrodes uses machines of various technologies, with their advantages and disadvantages. These widely differing methods used by the different machines provide similar end results, a lack of effectiveness of the mixing and kneading actions being offset by the processing time, which leads one to conclude that the methods for mixing and kneading carbon paste for electrodes are not yet optimized. Mixing at high temperatures is a given, however, if a good result is to be achieved quickly. But, due to electrode production requirements downstream from the mixers/kneaders, it is necessary to cool the paste at the end of the kneading. For this reason, modern facilities for manufacturing carbon paste for electrodes are always equipped with two devices or machines installed sequentially: a mixer-kneader which is one of the three above types and a cooler, usually a rotating tilted drum as illustrated in FIG. 3 and described above.

SUMMARY OF THE INVENTION

One aim of the invention is to propose a method and machine for manufacturing paste, particularly carbon paste, by mixing and kneading the component materials of the paste and using more efficient processing principles than those used in the prior art, in order to cause the binder, particularly pitch and more particularly liquid coal-tar pitch, to penetrate the fillers as fully as possible, particularly as far as possible into the particles of coke, preferably calcined petroleum coke.

Another aim of the invention is to propose a method and machine for manufacturing paste by mixing and kneading the components, optimizing the homogeneity of the delivered mixture to eliminate variations in the quality, composition, and proportions of the component materials.

Yet another aim of the invention is to provide a machine for manufacturing paste by mixing and kneading, delivering the paste directly at the required temperature with no need for a supplemental machine. In other words, the proposed machine for manufacturing the paste by mixing and kneading, itself performs the paste mixing, kneading, and cooling operations which are conventionally performed in two successively connected machines.

For this purpose, the invention proposes a method for preparing a paste by mixing or kneading materials, particularly for making aluminum production electrodes, said method comprising the following operations:

a) introducing the materials to be mixed and kneaded into a drum having an inner surface extending along a substantially horizontal axis of revolution, b) rotating the drum around the axis of revolution and urging the materials via centrifugation against the inner surface of the drum, and c) locally dislodging from the inner surface the materials centrifuged by the rotation of the drum and causing them to fall onto a granulating tool.

Thus the materials are peripherally distributed and compressed on the inner surface via centrifugation, and dropped onto the granulating tool away from the drum walls while their weight increases the velocity at which the materials come into contact with the granulating tool. In addition, there is a large volume inside the drum for receiving materials and thus for uniformly blending the delivered mixture.

In another feature of the invention, in operation c) the materials are preferably dislodged using a scraper maintained in a fixed position above the granulating tool, and the granulating tool is equipped with blades and is made to rotate about a granulation axis of rotation that is substantially parallel to the axis of revolution.

This crumbles the materials in an efficient manner.

Preferably, the method of the invention additionally comprises the following operations:

the blades are substantially arranged radially to the granulation axis of rotation, so as to come substantially in contact with the inner surface of the drum during the rotation of the granulating tool, the materials fall between the granulation axis of rotation and the location where the blades come substantially in contact with the inner surface of the drum, and the granulating tool is rotated in the same direction as the drum.

Thus the granulating tool additionally shears and mixes the materials, avoiding an accumulation of the materials upstream from the granulating tool. This increases the effectiveness of the granulating tool in mixing and kneading the materials.

In another feature of the invention, in operation b) the materials are preferably also compressed mechanically.

The mechanical compression supplements the centrifugal compression of the materials and improves the mixing and kneading of the materials.

In an additional feature, in operation b) the materials preferably pass between a roller and the inner surface of the drum.

The method preferably also has the following additional features:

in operation a), the materials to be mixed and kneaded are introduced at an upstream end of the drum, during an operation d), the thoroughly mixed and kneaded materials are collected at a downstream end of the drum, said downstream end being opposite the upstream end in the direction of the axis of revolution, the materials are continuously mixed and kneaded, with operations a), b), c) and d) being performed simultaneously, said materials being introduced at the upstream end while previously introduced materials are kept in the drum and other thoroughly mixed materials are collected at the downstream end.

Thus the paste is created by continuous mixing and kneading of the materials, which provides an efficient processing of the materials.

In a supplemental feature of the invention, the granulating tool preferably extends substantially to the upstream end in the direction of the axis of revolution, but an upstream space is arranged between the upstream end and the roller.

This further improves the effectiveness of the processing of the materials, particularly by blending the binder and the fillers before the penetration of the binder into the fillers is assisted by their passage between the roller and the inner surface of the drum.

In another feature of the invention, the granulating tool preferably extends substantially to the downstream end in the direction of the axis of revolution, but a downstream space is arranged between the downstream end and the roller.

The paste formed by the mixed and kneaded materials can thus be cooled before it is collected for use at the drum outlet, while continuing the mixing and kneading continues.

It is preferable if water is poured onto the materials in said downstream space, to cool them.

In another supplemental feature of the invention, a liquid binder, particularly liquid coal-tar pitch, is preferably introduced continuously into the lower portion of the drum, followed by a filler, particularly calcined coke, introduced onto the coal-tar pitch.

The filler is thus located above the binder before the mixing and kneading, which further improves the effectiveness of the processing of the materials.

Lastly, the materials are preferably advanced by the granulating tool towards the downstream end.

A device of this type is already known, such as the one illustrated in FIG. 3, which comprises:

a frame, a drum having an inner surface extending along an axis of revolution, a device for rotating the drum around the axis of revolution relative to the frame, a scraper placed in proximity to the inner surface of the drum, and a granulating tool.

In order to provide the above improvements in accordance with the invention, the axis of revolution is substantially horizontal and the granulating tool is arranged under the scraper.

Thus the materials dislodged by the scraper from the inner surface of the drum fall onto the granulating tool, their weight increasing the speed at which the materials come into contact with the granulating tool. In addition, the drum can contain a large volume of materials in order to homogenize the mixture properly.

In another feature of the invention, the device additionally comprises a roller which rotates freely around a compression axis of rotation substantially parallel to the axis of revolution, and a means for exerting pressure on the roller in the direction of the inner surface of the drum.

The materials are thus compacted by the roller before being crumbled by the granulating tool, which improves the effectiveness of the processing.

In an additional feature of the invention, the roller is preferably arranged substantially at the bottom of the drum and the granulating tool is positioned higher than the roller.

The position of the roller at the bottom of the drum reinforces the effectiveness of the roller, because placing the granulating tool higher than the roller reduces the height from which the materials fall onto the granulating tool.

In another feature of the invention, the means of exerting pressure preferably comprises actuators and a control device for the actuators which controls the application of constant pressure from the roller along the compression axis of rotation.

Thus the pressure on the materials can be adapted to the amount of materials in the drum by moving the compression axis of rotation to improve the effectiveness of the roller.

In yet another supplemental feature of the invention, the actuators are preferably staggered relative to each other in the direction of the compression axis of rotation, and the control device controls a simultaneous displacement of the actuators to maintain a constant angle between the compression axis of rotation and the axis of revolution.

Thus the compression axis of rotation can be moved so that it is always parallel in the same direction, to optimize the effectiveness of the roller.

In another feature of the invention, the granulating tool is preferably driven to rotate around a granulation axis of rotation that is substantially parallel to the axis of revolution.

The device preferably also has the following features:

the drum additionally comprises at least one inlet for materials at an upstream end, for continuously introducing materials to be mixed and kneaded inside the drum, and an outlet for materials at a downstream end, for extracting mixed and kneaded materials from the drum, the upstream end being opposite the downstream end in the direction of the axis of revolution, and the axis of revolution has a slight downward tilt in the direction of the downstream end, to encourage the materials in the drum to move from the upstream end towards the downstream end.

Thus materials automatically advancing from the inlet to the outlet can be continuously processed, which improves the effectiveness of the device.

Alternatively, the device preferably has the following additional features:

the drum additionally comprises at least one inlet for materials at an upstream end, for continuously introducing materials to be mixed and kneaded inside the drum, and one outlet for materials at a downstream end, for extracting mixed and kneaded materials from the drum, the upstream end being opposite the downstream end in the direction of the axis of revolution, and the granulating tool progressively moves away from the inner surface of the drum in the direction of the downstream end.

Thus materials automatically advancing from the inlet to the outlet can be continuously processed, which improves the effectiveness of the device.

In another feature of the invention, the device preferably also comprises an adjustment arm supporting the scraper, said adjustment arm being pivotable around the axis of revolution in order to adjust the position of the scraper.

Thus the position of the scraper can be adapted to the mixing and kneading conditions of the materials, particularly to the amount of materials in the drum.

In an additional feature, the drum preferably comprises at the upstream end a heated inlet for liquid material at a temperature greater than or equal to 150° C. and an unheated inlet for non-liquid material.

The materials are therefore introduced into the drum in a manner that facilitates their mixing and kneading.

In an additional feature of the invention, the inlet for liquid material and the inlet for non-liquid material are arranged in the lower portion of the drum, and the inlet for liquid material is upstream from the inlet for non-liquid material relative to the direction of rotation of the drum.

The non-liquid material is thus presented above the liquid material, which facilitates the mixing and compacting of the materials, in particular when the liquid material is a binder and the non-liquid material comprises fillers.

In another feature of the invention, the granulating tool preferably comprises blades extending radially to the granulation axis of rotation and adapted to come substantially into contact with the inner surface of the drum.

BRIEF DESCRIPTION OF THE DRAWINGS

Other features and advantages of the invention will be better understood from the following description of an embodiment of the invention concerning a device for mixing and kneading, provided as a non-limiting example and referring to the attached drawings in which:

FIG. 9 is a partial cross-sectional view along the line labeled IX-IX in FIG. 8, of the mixing and kneading device of the invention.

FIGS. 4a to 9 illustrate a device 50 for mixing and kneading materials 30 to form a paste intended in particular for making anode blocks for aluminum electrolysis.

Figure 1A:
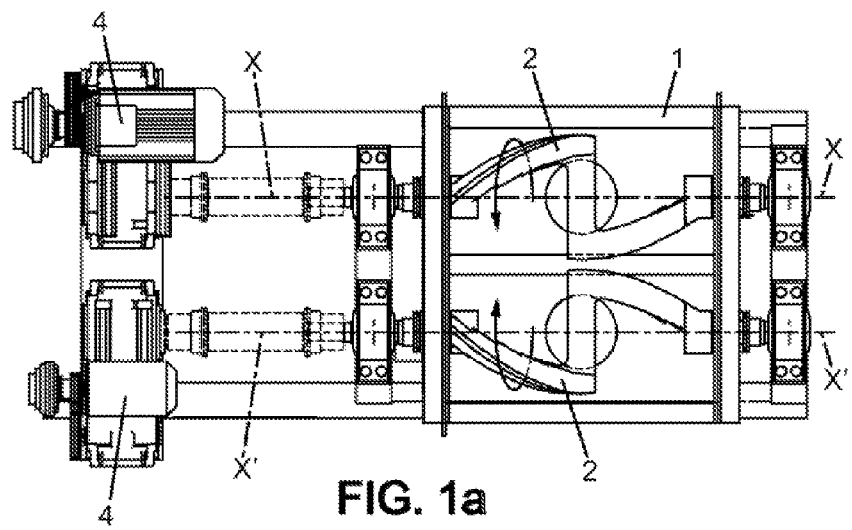
FIG. 1a is a top view of a Z-arm mixing and kneading device of the prior art, in which the cover of the drum has been removed to show the arrangement of the rotating arms in the drum.
Figure 1B:
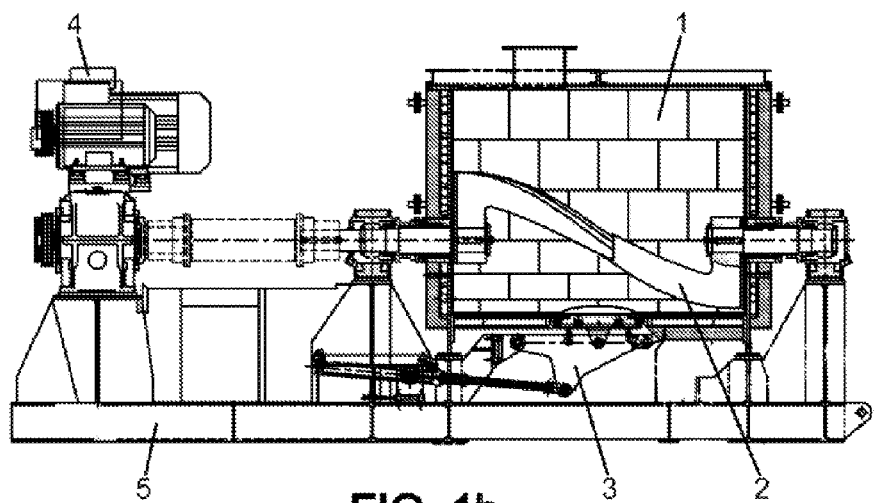
FIG. 1b is a front cross-sectional view of the mixer in FIG. 1a, FIG. 2a is a simplified representation in a front cross-sectional view of another mixing and kneading device of the prior art, of the horizontal worm type.
Figure 2A:
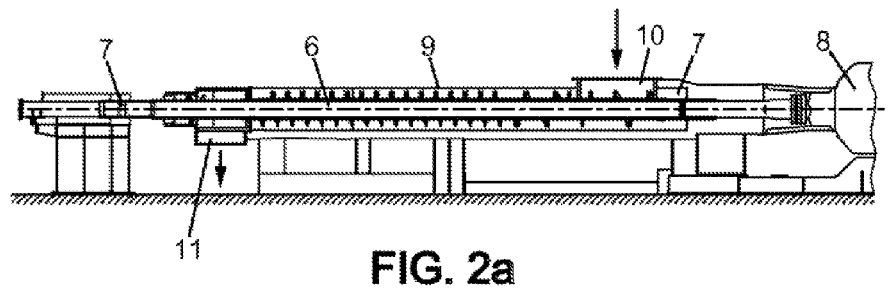
FIG. 2b is a transverse cross-sectional view of the device represented in FIG. 2a, showing the arrangement of the moveable mixing tools mounted on the worm and the fixed tools mounted on a casing.
FIG. 2c is a perspective view of a moveable tool mounted on the worm of the mixer of FIG. 2a, FIG. 2d is a perspective view of a fixed tool mounted onto the casing of the mixer of FIG. 2a, FIG. 3 is a diagram showing a front cross-sectional view of another mixing and kneading device of the prior art, FIG. 4a schematically represents a transverse cross-sectional view of a mixing and kneading device of the invention, FIG. 4b schematically represents a front cross-sectional view of the mixing and kneading device of the invention.
Figure 2B:
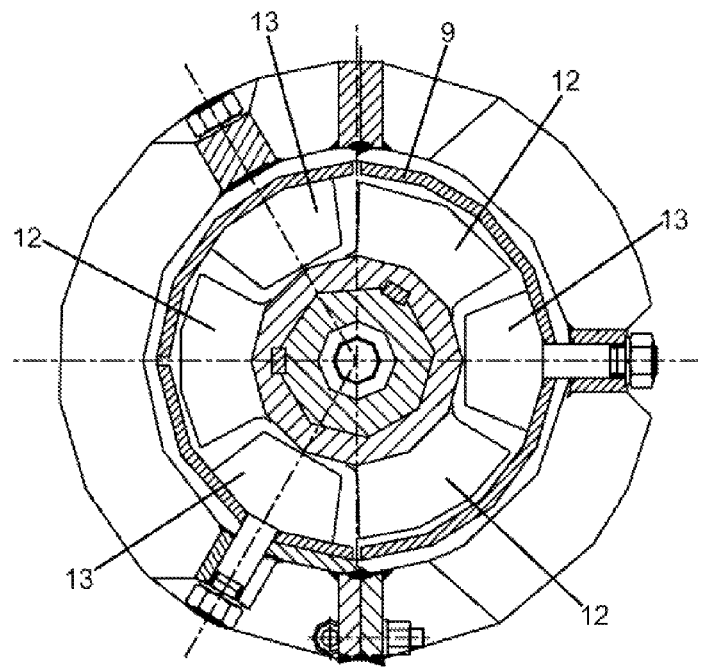
Figure 2C:
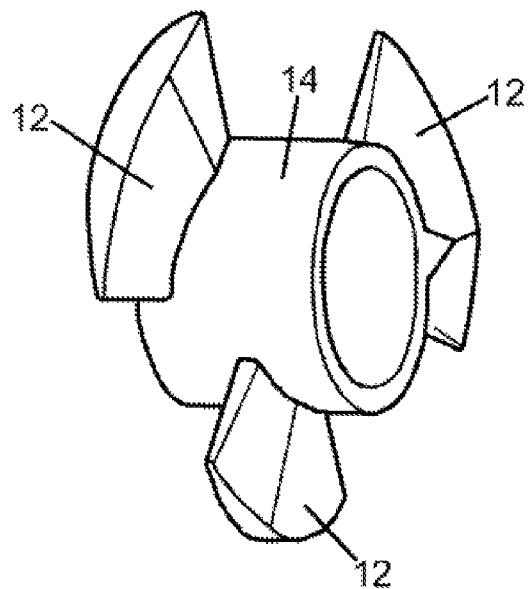
Figure 2D:
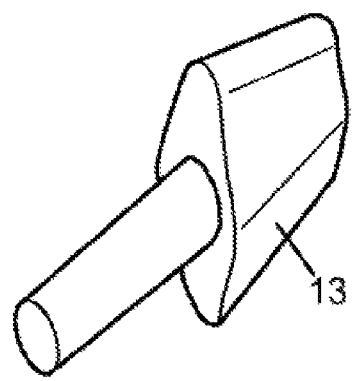
Figure 3:
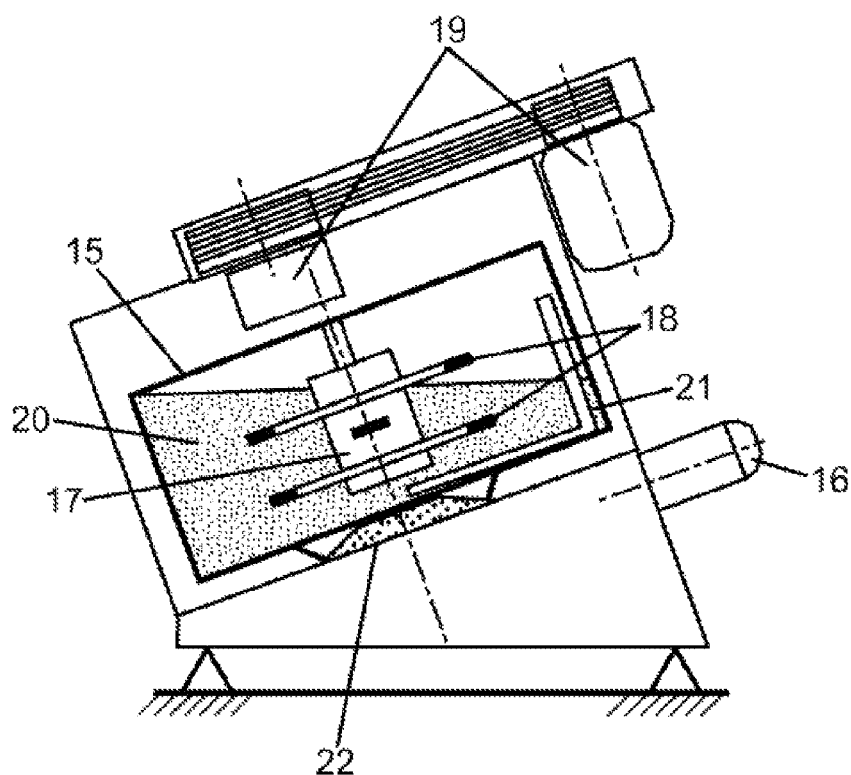
Figure 5:
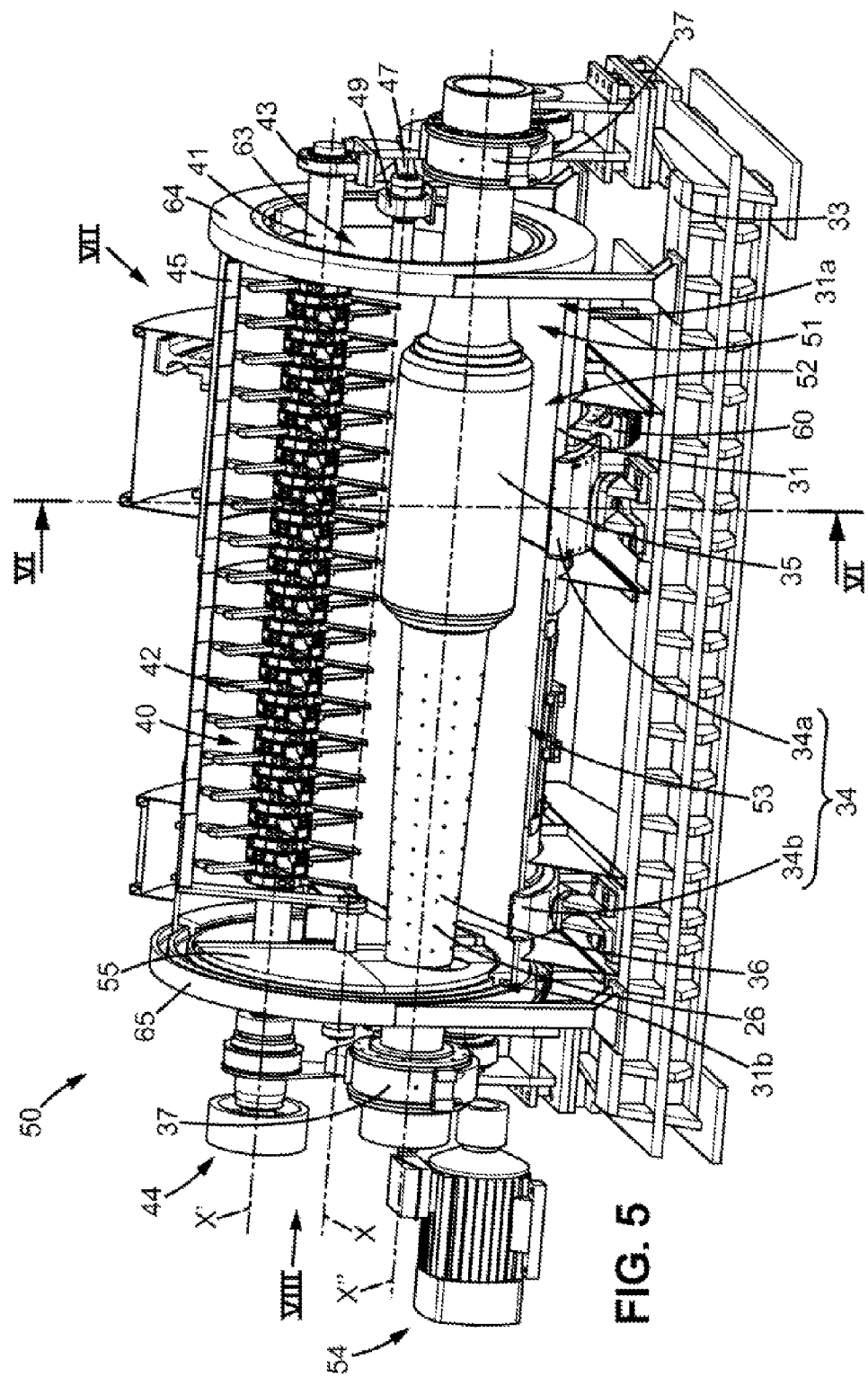
FIG. 5 is a perspective view, with sections removed, of the mixing and kneading device of the invention.

This device 50 essentially comprises a frame 33, a drum 31, a device 58, 59, 60 for rotating the drum, a granulating tool 40, a scraper 45, and a roller 35.

The drum 31 is substantially cylindrical, with a circular cross-section. It has an inner surface 32 with a circular cross-section and has an axis of revolution X. It is assembled to pivot on the frame 33, on which it rests by means of pads 34a, 34b which form bearings 34.

The drum 31 has an upstream end 31a in the direction of the axis of revolution X closed off by an upstream plate 54, and a downstream end 31b closed off by a downstream plate 55. The upstream plate 54 and the downstream plate 55 are fixed relative to the frame 33 and each one consists of a plate extending substantially perpendicularly to the axis of revolution X. The upstream plate 54 and the downstream plate 55 are respectively supported by an upstream supporting frame 64 and a downstream supporting frame 65, both fixed to the main frame 33 and connected to the drum 31 by baffle seals.

The axis of revolution X is substantially horizontal. It may be tilted slightly downwards in the direction of the downstream end 31b, in order to encourage a gravitational progression on the materials 30 in the direction of the downstream end 30b.

The drive mechanism comprises a gear motor 58, a pinion 59, and a ring gear 60. The gear motor 58 rotationally drives the pinion 59, preferably by means of a reduction gear and clutch. The pinion 59 engages with the ring gear 60 extending around the drum 31.

The inner surface 32 of the drum 31 delimits an inner volume 63, also delimited in the direction of the axis of revolution X by the upstream plate 54 and the downstream plate 55. The inner volume 63 comprises an upstream blending area 51, a central compacting and kneading area 52, and a downstream cooling area 53.

The granulating tool 40 comprises a rotor consisting of a shaft 41 and blades 42 attached to the shaft 41. The shaft 41 extends along a granulation axis of rotation X', parallel to the axis of revolution X. A driving means 44, preferably a gear motor, drives the shaft 41 to rotate around the granulation axis of rotation X' relative to the frame 33, in the same direction 25 as the drum 31.

The blades 42 extend radially relative to the granulation axis of rotation, to a radial end 42a. During the rotation of the shaft 41, the radial end 42a of the blades comes substantially in contact with the inner surface 32 of the drum 31. The linear velocity of the radial end 42a of the blades is greater than the linear velocity of the inner surface 32 of the drum 31, such that the blades 42 tend to accelerate the materials 30, and not create an accumulation of materials in front of the granulating tool.

The blades 42 are distributed between the upstream plate 54 and the downstream plate 55, in other words they are arranged in the upstream area 51, the central area 52, and the downstream area 53. Preferably, the blades 42 comprise a shearing part supported by a holder fixed to the shaft 41 and consisting of a ring of at least two parts assembled around the shaft 41 with bolts for example.

The shaft 41 passes through the upstream plate 54 and the downstream plate 55. It is connected to the frame 33 by bearings 43 and a supporting arm 56. The bearings 43 supporting the shaft 41 of the granulating tool 40 preferably comprise roller bearings or anti-friction rings. The supporting arm 56 can be moved by the action of an actuator, consisting in this embodiment of a jack 57, in order to modify the distance between the granulation axis of rotation X' and the inner surface 32 of the drum 31.

Preferably, the granulation axis of rotation X' is tilted slightly relative to the axis of revolution X by an angle α of several tenths of a degree to several degrees, such that the granulating tool 30 is closer to the inner surface 32 of the drum near the upstream end 31a than it is near the downstream end 31b, creating a progression of the materials 30 in the drum 31 from the upstream end 31a towards the downstream end 31b. Advantageously, the angle α between the granulation axis of rotation X' and the axis of revolution X is adjusted by the jacks 57 and the supporting arms 56. This angle α determines the speed at which the materials 30 advance inside the drum 31 and consequently the level to which the drum 31 is filled with materials 30. Controlling the rate of advancement allows accurately adjusting the operation of the granulating tool 40 to the amount of material 30 delivered by the inlets 27, 28 and utilizing all available power of the gear motor 44 to maximize the flow rate of the processed materials 30. For this purpose, the adjustment of the position of the granulating tool 40 is advantageously linked to the power of the gear motor 44 in order to maintain the gear motor 44 at its optimum level.

The scraper 45 extends towards the inner surface 32 of the drum 31. It comprises an active surface 45a intended to come into contact with the materials 30 being rotated by the drum 31, in order to direct them towards the blades 42 of the granulating tool 40. The active surface 45a extends parallel to the direction of the axis of revolution X, from the upstream plate 54 to the downstream plate 55, in other words in the upstream area 51, the central area 52, and the downstream area 53. It forms an angle of about 45 degrees with the direction of displacement of the materials, in other words with the inner surface 32 of the drum 31 at the point where the scraper 45 extends towards the drum.

Figure 8:
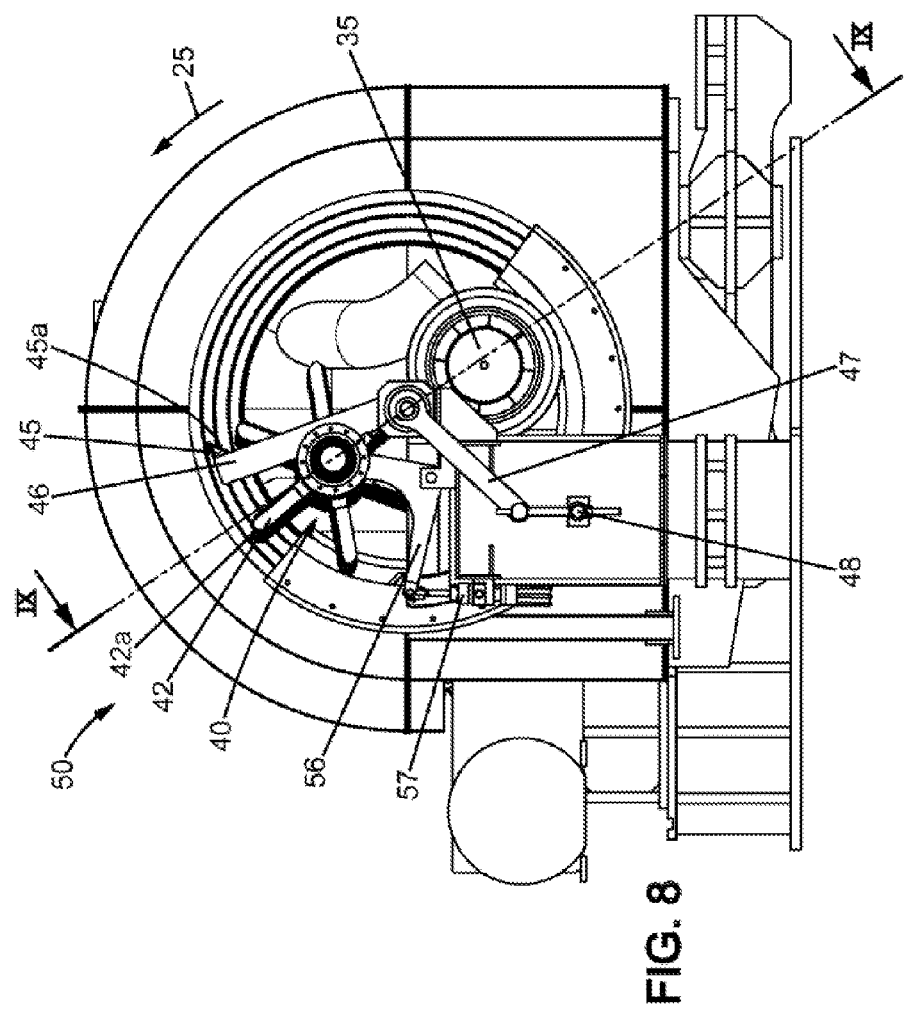
FIG. 8 is a view of the mixing and kneading device of the invention in the direction of the arrow labeled VIII in FIG. 5, with sections removed.

As illustrated in FIG. 8, the scraper 45 is supported at each of its ends in the direction of the axis of revolution X by an arm 46 assembled to pivot within a bearing 49. A rod 47 integrally attached to said arm 46 controls the rotation of the scraper 45 around the axis of revolution X, by the action of a screw-nut system 48 (in the embodiment illustrated) or a similar system, in order to adjust the position of the scraper 45 relative to the granulating tool 40.

The position of the scraper 45 in the drum 31 is thus continuously and easily adjustable. The position of the scraper 45 determines the manner in which the paste dislodged from the inner surface 32 of the drum 31 comes into contact with the blades 42 of the granulating tool 40. An accurate adjustment of this geometry is an essential advantage, because the effectiveness of the granulating tool 40 is highly dependent on this. The yield from mixing can be optimized by adjusting the scraper 45.

The active surface 45a is preferably formed by interchangeable scraping tools, equipped for example with strips of ceramic or tungsten carbide for wear resistance.

The roller 35 has a cylindrical outside surface 35a, circular in cross-section, extending along a compression axis of rotation X". The outside surface 35a faces the inside surface 32 of the drum 31, in the central area 52 only. The roller 35 is supported by a shaft 36 passing through the upstream plate 54 and the downstream plate 55. The shaft 36 is mounted to rotate on the frame 33 by means of roller bearings 37 placed outside the drum 31 and supported by arms 39 pivotably mounted on the frame 33. The shaft 36 can thus turn freely relative to the frame 33 around the compression axis of rotation X". The shaft 36 can be moved by actuators, consisting in this embodiment of jacks 38, in order to vary the distance between the outside surface 35a of the roller 35 and the inside surface 32 of the drum 31, in other words to vary the compression of the materials 30 in the central area 52 of the inside volume 63 of the drum 31.

Preferably, the load applied by the roller 35 via the jacks 38 is adjusted remotely during the operation of the device 50 and is linked to the power consumed by the gear motor 58 rotating the drum 31.

The position of the bearings 37 on the jacks 38 is controlled either directly or indirectly by movement sensors, for example using laser technology or a magnetostrictive effect, in order to verify the positioned height of the roller 35 and its horizontality.

The device 50 preferably comprises a jack 38 at each of the two ends of the shaft 36 in the direction of the compression axis of rotation X". In addition, a control device controls the jacks 38 so that the angle between the compression axis of rotation X" and the axis of revolution X remains constant. As a variant, although this is not preferred, the jacks 38 can be replaced with springs.

The roller 35 is arranged at the bottom of the drum, in the lower half of the drum 31, substantially at the very bottom of the drum 31. The granulating tool 40 is arranged higher than the roller 35 in the drum 31, leaving the bottom of the drum 31 to the roller 35. If there is no roller 35, the granulating tool 40 could be arranged at the bottom of the drum 31.

The device 50 additionally comprises a cooling device which sprays water in the downstream area 53. This water spraying device comprises holes 26 in the shaft 36, distributed in the direction of the compression axis of rotation X" and around the shaft 36. These holes 26 open into the hollow core of the shaft 36 which is supplied water from an end of the shaft 36.

The device 50 also comprises, at the upstream end 31a of the drum 31, a pipe passing through the upstream plate 54 and forming the inlet 27 for heated liquid and another pipe, having a larger cross-section, passing through the upstream plate 54 and forming the inlet 28 for dry materials, and at the downstream end 31b, a removal scraper 61 dislodging the materials 30 from the inner surface 32 of the drum 31 so they travel towards the center of the drum 31 where a diverter 29 extends through the downstream plate 55 and forms the downstream outlet. The inlet 27 for liquid and the inlet 28 for dry products substantially empty into the bottom of the drum 31. The inlet 28 for dry products is placed after the inlet 27 for liquid, relative to the direction of rotation 25 of the drum 31.

Large access doors 62 are installed in the central area of the drum 31, to allow easy access to the inside volume 63 of the drum for maintenance purposes, without weakening the structure.

The drum 31 consists of curved and welded sheet metal of different thicknesses according to the mechanical stresses they are subjected to, with the greatest thickness facing the roller 35. Sheathing, not represented in the figures, protects the inner surface 32 from wear. The sheathing thickness is adapted to the strength of the stresses, with a greater thickness used in the central area while simple longitudinal strips welded onto the inside surface 32 of the drum 31 will be sufficient to protect it from wear in the upstream 51 and downstream 53 areas.

The device assembly rests on a common frame 33, in a manner that contains the loads built up by the various components inside the device without transmitting them to the environment. The device 50 is thus autonomous, with the sole installation constraints being that it support its own weight and be connected to the pipes that supply and carry away the materials.

Figure 6:
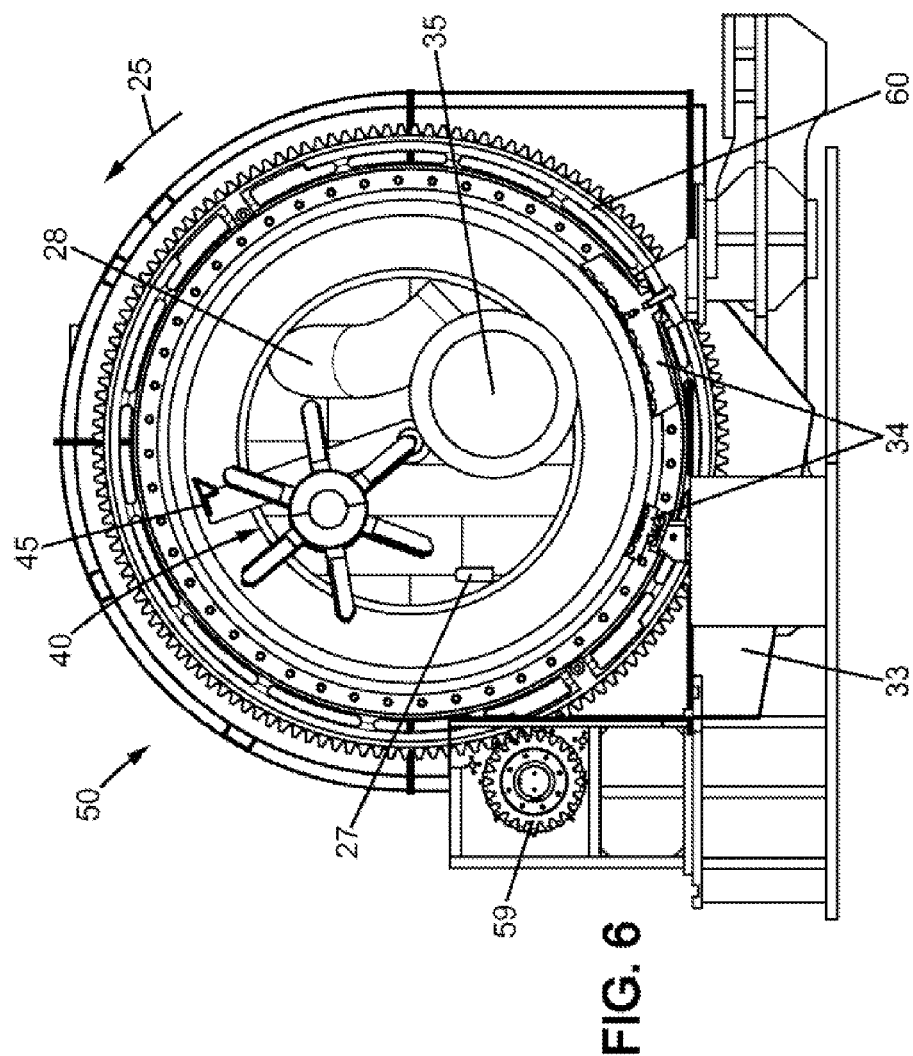
FIG. 6 is a transverse cross-sectional view along the line labeled VI-VI in FIG. 5, of the mixing and kneading device of the invention.
Figure 7:
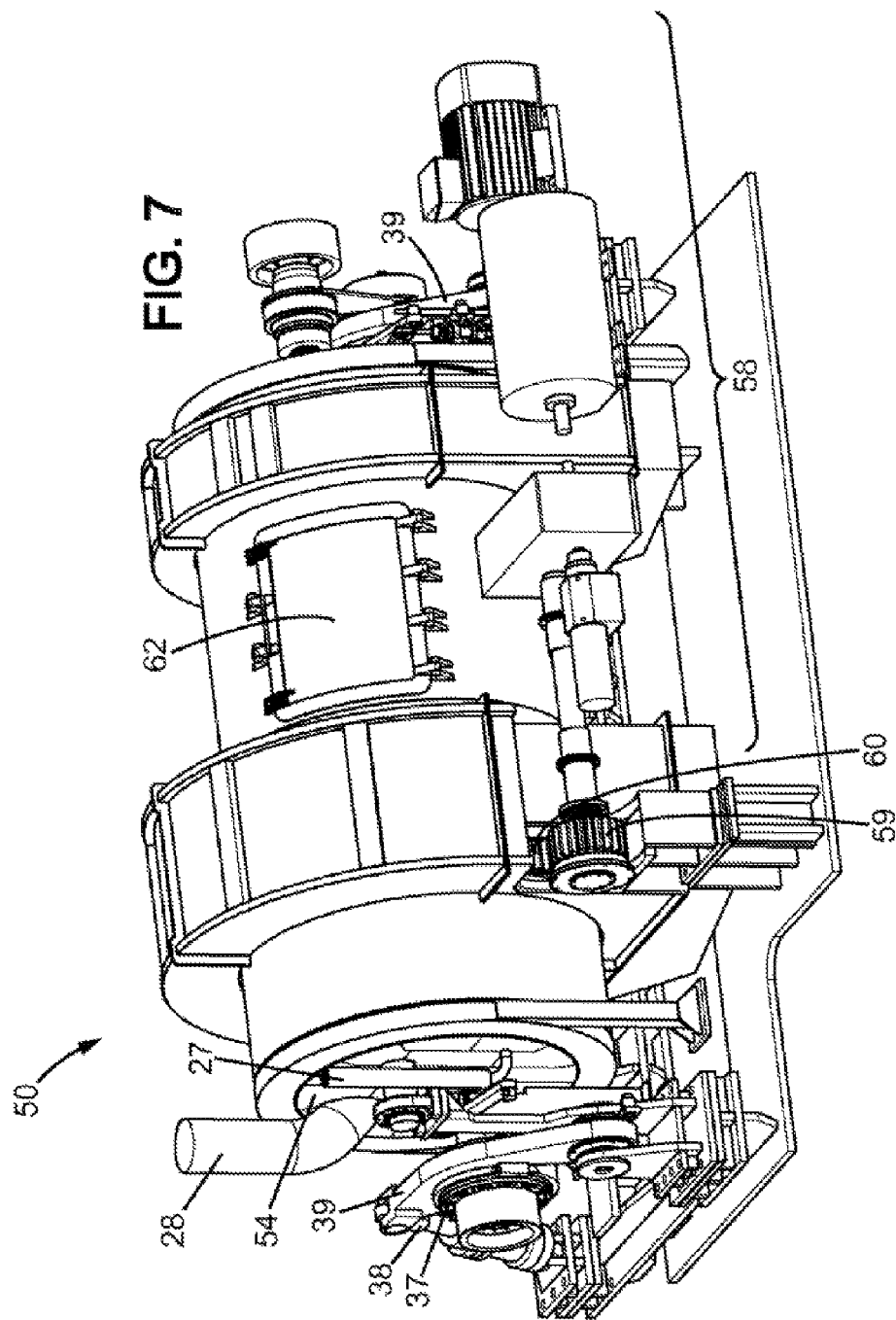
FIG. 7 is a view of the mixing and kneading device of the invention in the direction of the arrow labeled VII in FIG. 5.

The drum 31 is supported on the frame 33 by two pad bearings 34a, 34b, one 34a located next to the upstream end 31a, preferably under the roller 35 where the stresses on the drum 31 are the highest, the other 34b at the downstream end 31b. Each bearing 34, as illustrated in FIG. 6, comprises two pads 34a, 34b covered with an anti-friction alloy, in contact with the outside surface of the drum 31. Lubrication of the interface between pad/outside surface of the drum 31 is achieved by a film of hydrodynamic oil which is formed due to the velocity of the drum 31 and the viscosity of the oil. To complete the lubrication, particularly during the startup and shutdown phases where the velocity is zero at certain moments, hydrostatic lubrication is achieved by injecting oil at high pressure at the center of the pads 34, to force the drum 31 to detach from the surface of the pad 34. The pads are assembled onto axial ball joints to give them the degrees of freedom necessary for complete coverage of the outside surface of the drum 31. One of the bearings 34 is equipped with pads that are also covered with anti-friction metal on these lateral faces corresponding to two rings welded to the outside surface of the drum 31 to hold the drum 31 in place axially. The pads 34 are sized to the radial stresses they receive, the largest 34a being placed under the roller 35. Other systems for supporting the drum such as half sliding bearings, roller bearings, wheels of metal or fitted with pneumatics and not detailed here, lie within the scope of the invention.

The ring gear 60 is bolted onto a flange welded to the ferrule, preferably in the central area 52, thus also creating a reinforcement of the drum 31 structure in this particularly stressed area. The pinion 59 is mounted onto two bearings bolted to the frame 33 and the distance from the ring gear 60 can be adjusted in order to adjust how they mesh. To simplify the arrangement, the pair of gears is designed to be able to operate with the same lubricating oil as the one for the pads 34. Thus a single casing protects the assembly formed by the pinion 59, the ring gear 60, and the bearing 34a at the upstream end 31a. Another casing is installed around the bearing 34b located at the downstream end 31b.

The motor system comprises an electric motor coupled to a speed reducing gear train with parallel gears, connected to the pinion 59 by an extension with universal joints. The resulting rotational velocity of the drum 31, which is the nominal speed of the motor divided by the total reduction ratios of the reducing gear train and the paired pinion 59 and ring gear 60, is sufficient to centrifuge, meaning to hold against its inner surface 32, the materials 30 contained in the drum 31. An auxiliary drive consisting of a braking motor and a speed reducing gear train and a disengageable coupling with manual control can be substituted for the main motor, to rotate the drum at slow speeds for maintenance or to perform certain operations.

Preferably, the roller 35 consists of a massive sleeve, considered a consumable part and detachably fixed to the shaft 36.

During operation, as the drum 31 is rotated, materials 30 are introduced into the upstream area 51 of the drum 31 through the inlet 27 for liquid and the inlet 28 for dry product.

Preferably, first the binder is introduced through the inlet 27 for liquid, then fillers are poured in through the inlet 28 for dry materials. The binder is advantageously introduced at a high temperature, typically 180 to 200° C. in the case of liquid pitch.

The drum is driven by the gear motor 58 in one direction 25 at a sufficient velocity to centrifuge the materials 30 it contains against its inner surface 32. In the upstream area 51, the materials 30 press against the inner surface 32 of the drum 31 due to the centrifugation effect and are rotationally urged towards the scraper 45 whose active surface 45a pushes the materials into the blades 42 of the granulating tool 40, where the first mixing occurs. After the granulating tool 40, the newly mixed materials 30 are again centrifuged against the inner surface 32 of the drum 31 and again pass under the inlets 27, 28 for raw materials.

Three layers of materials are thus formed: the first consists of materials already introduced and mixed and not having yet left the upstream area 51, the second layer is the liquid pitch preferably supplied before the solid materials in order to optimize the speed at which they are integrated with the other materials, and the third and last layer consists of solid materials. The materials thus undergo several dozen mixing cycles before reaching the central area 52.

In the central area 52, during an operating cycle the materials 30 centrifuged against the inner surface 32 of the drum 31 are successively compressed by the roller 35, urged towards the scraper 45 which dislodges the compacted layer of materials 30 and directs it towards the granulating tool 40 where the layer is finely granulated, mixed, and cut by the rotating blades 42. Another cycle then begins. This occurs hundreds of times during the general process. The compression exerted by the roller 35 pushes the binder around and into the pores of the solid particles of dry materials, guaranteeing interpenetration of the components. The kneading in the granulating tool 40 provides additional mixing and enhances the blending of the paste and the coating of the particles by the binder, because of the intense shear forces applied to the layer of materials by the blades 42.

When the roller 35 is pressed against the paste as it rotates with the drum 31 during kneading, friction causes the roller 35 to turn at a rotational velocity such that the linear velocity of its outer surface 35a is identical to that of the rotating paste. It is important that this equilibrium not be upset, to avoid creating secondary stresses in the paste and in the components of the device 50.

The mixing and kneading in the upstream 51 and central 52 areas is advantageously done at a high temperature, typically 180 to 200° C., to take advantage of the fluid state of the pitch. However, the hot paste 30 is not ready to be used in an optimum manner, because its mechanical properties are then weak. It is necessary to cool it to a temperature where it recovers sufficient consistency for the handling required during the subsequent process.

The invention therefore comprises an upstream cooling area 53 in the drum 31. Water is poured onto the paste through holes 26 in the shaft 36 in order to cool the paste, typically between 145 and 170° C., by heat transfer between the paste and the water, the primary phenomenon involved in the exchange being water vaporization. The water can be introduced as is shown in FIG. 4b, through the shaft 36 supporting the roller 35 for a homogeneous distribution or by any other pipe passing through the downstream plate 55. In the downstream area 53, the paste 30 continues in cycles of passing through the blades 42 of the granulating tool 40, where it is directed by the scraper 45, as occurred in the upstream area 51. This improves the mixing and homogeneity of the paste 30 as well as the coating of the particles by the binder, while cooling the paste 30 at the same time. Several hundred cycles are carried out in the downstream area 53.

At the downstream end 31b, the finished paste is collected by the emptying scraper 61 in the outlet duct 29 traversing the downstream plate 55.

Advantageously, the vapors and dust, particularly the water vapor produced by the cooling, are drawn away through the outlet duct 29.

Of course, the invention is in no way limited to the above embodiments described as illustrative non-limiting examples.

The invention is therefore not limited to the mixing and kneading of the raw materials used for manufacturing anode or cathode paste, composed of liquid pitch, coke, and crushed and ground waste. It is applicable to any paste manufacturing done by mixing and kneading on one or more components.

As a variant, the bearings 37 could be guided in rails integrally attached to the frame 33 and subject to the direct action of hydraulic cylinder jacks 38.

Furthermore, in order to establish a movement of materials from the upstream end 31a towards the downstream end 31b of the drum 31, the drum 31 could be slightly conical instead of cylindrical, widening towards the downstream end 31b. The axis of revolution X, as well as the granulation axis of rotation X' and the compression axis of rotation X'', will then advantageously be parallel and horizontal.

The invention claimed is:

1. Device for preparing a paste by kneading or mixing materials, particularly for making aluminum production electrodes, said device comprising:
    a frame,
    a drum having an inner surface extending along an axis of revolution,
    a device for rotating the drum around the axis of revolution relative to the frame,
    a scraper placed in proximity to the inner surface of the drum,
    a granulating tool,
    wherein the axis of revolution is substantially horizontal and the granulating tool is arranged under the scraper, and
    a roller which rotates freely around a compression axis of rotation substantially parallel to the axis of revolution, and a pressure exerting arrangement for exerting pressure on the roller in the direction of the inner surface of the drum.

2. Device according to claim 1, wherein the roller is arranged substantially at the bottom of the drum and the granulating tool is positioned higher than the roller.

3. Device according to claim 1, wherein the pressure exerting arrangement comprises actuators and a control device for the actuators which controls the application of constant pressure from the roller along the compression axis of rotation.

4. Device according to claim 3, wherein the actuators are staggered relative to each other in the direction of the compression axis of rotation, and the control device controls a simultaneous displacement of the actuators to maintain a constant angle between the compression axis of rotation and the axis of revolution.

5. Device according to claim 1, wherein the granulating tool is driven to rotate around a granulation axis of rotation substantially parallel to the axis of revolution.

6. Device according to claim 1, wherein:
    the drum additionally comprises at least one inlet for materials at an upstream end for continuously introducing materials to be mixed and kneaded inside the drum, and an outlet for materials at a downstream end, for extracting mixed and kneaded materials from the drum, the upstream end being opposite the downstream end in the direction of the axis of revolution, and
    the axis of revolution has a slight downward tilt in the direction of the downstream end, to encourage the materials in the drum to move from the upstream end towards the downstream end.

7. Device according to claim 1, wherein:
    the drum additionally comprises at least one inlet for materials at an upstream end, for continuously introducing materials to be mixed and kneaded inside the drum, and one outlet for materials at a downstream end, for extracting mixed and kneaded materials from the drum, the upstream end being opposite the downstream end in the direction of the axis of revolution, and
    the granulating tool progressively moves away from the inner surface of the drum in the direction of the downstream end.

8. Device according to claim 1, additionally comprising an adjustment arm supporting the scraper, said adjustment arm being pivotable around the axis of revolution in order to adjust the position of the scraper.

9. Device according to claim 1, wherein the granulating tool comprises blades extending radially to the granulation axis of rotation and adapted to come substantially into contact with the inner surface of the drum.

10. Device for preparing a paste by kneading or mixing materials, particularly for making aluminum production electrodes, said device comprising:
    a frame,
    a drum having an inner surface extending along an axis of revolution,
    a device for rotating the drum around the axis of revolution relative to the frame,
    a scraper placed in proximity to the inner surface of the drum, and
    a granulating tool, wherein,
    the axis of revolution is substantially horizontal and the granulating tool is arranged under the scraper,
    the drum additionally comprises at least one inlet for materials at an upstream end for continuously introducing materials to be mixed and kneaded inside the drum, and an outlet for materials at a downstream end, for extracting mixed and kneaded materials from the drum, the upstream end being opposite the downstream end in the direction of the axis of revolution,
    the axis of revolution has a slight downward tilt in the direction of the downstream end, to encourage the materials in the drum to move from the upstream end towards the downstream end, and
    the drum comprises at the upstream end a heated inlet for liquid material at a temperature greater than or equal to 150° C. and an unheated inlet for non-liquid material.

11. Device according to claim 10, wherein the inlet for liquid material and the inlet for non-liquid material are arranged in the lower portion of the drum, and the inlet for liquid material is upstream from the inlet for non-liquid material relative to the direction of rotation of the drum.

\* \* \* \* \*